Figure 1:
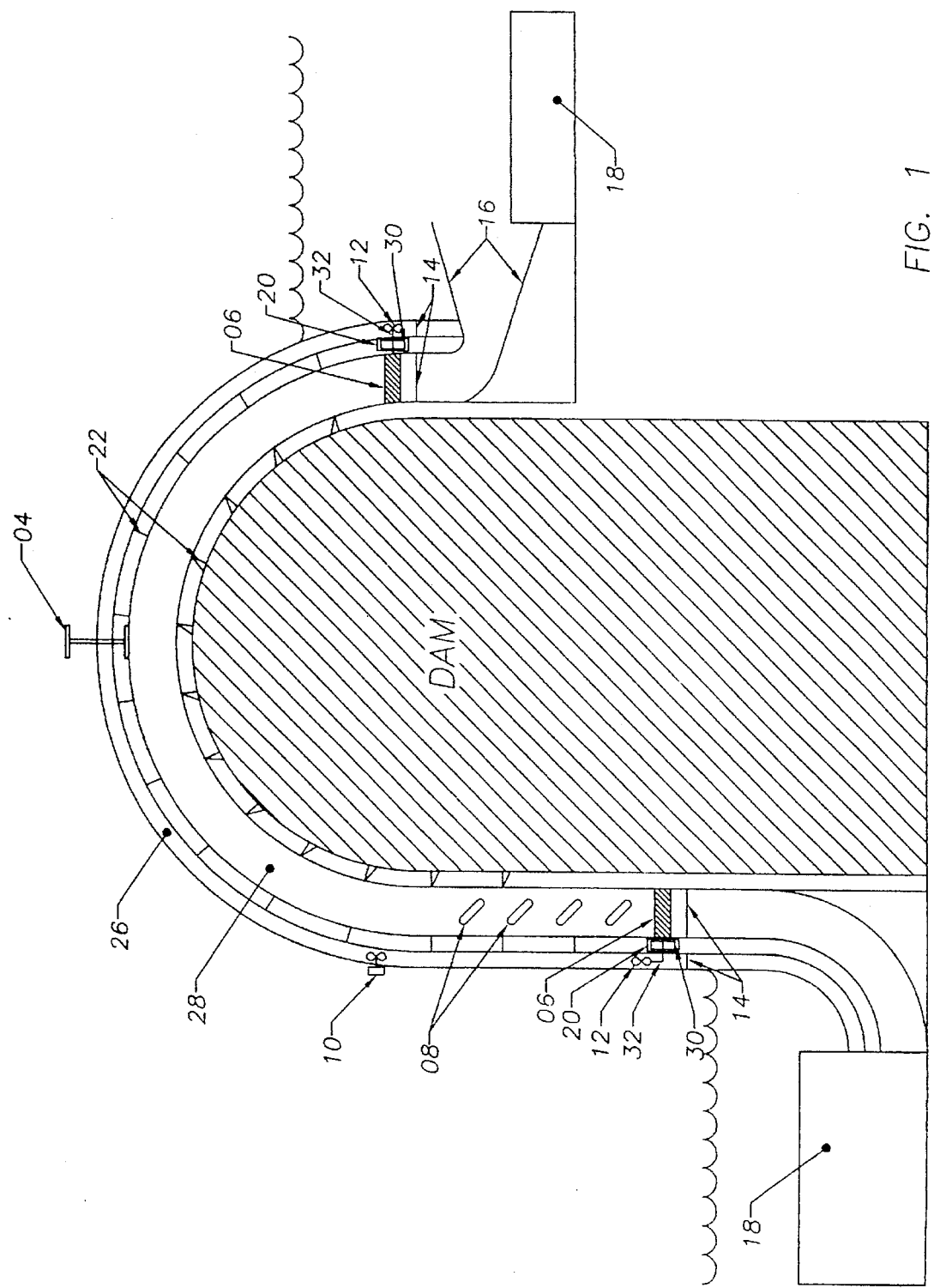

United States Patent [19]
Bethune

[11] Patent Number: 5,660,499
[45] Date of Patent: Aug. 26, 1997

[54] TWO-WAY FISH SIPHON OVERPASS

[76] Inventor: James N. Bethune, 222 Ollis Rd., #58, Cave Junction, Oreg. 97523

[21] Appl. No.: 388,497

[22] Filed: Feb. 15, 1995

[51] Int. Cl.$^6$ ..................................................... E02B 8/08
[52] U.S. Cl. .................................................................. 405/83
[58] Field of Search ........................................ 405/81, 82, 83

[56] References Cited

U.S. PATENT DOCUMENTS

| | | | |
|---|---|---|---|
| 4,437,431 | 3/1984 | Koch | 405/81 |
| 4,629,361 | 12/1986 | Zimmerman | 405/81 |
| 5,161,913 | 11/1992 | Boylan | 405/81 |

FOREIGN PATENT DOCUMENTS

| | | | |
|---|---|---|---|
| 823486 | 5/1981 | U.S.S.R. | 405/83 |
| 1167261 | 7/1985 | U.S.S.R. | 405/83 |

*Primary Examiner*—William P. Neuder

[57] ABSTRACT

A method and apparatus for transporting migratory fish over dams. Fish are transported over dam in downstream migration to the sea and upstream migration to spawning beds. The method includes transporting threatened or endangered species from spawning beds by means of fish nets 46 to fish siphon 28 if needed; powering closure gates 14 and louvers 06 by hydro-power generated by power siphon 26; slowing water for returning fish; using attractants to guide fish to fish siphon 28; operating the apparatus manually or with timing devices; allowing fish to be emptied both upstream and downstream of dam. The apparatus includes a fish siphon 28 and power siphon 26 with propeller 12; planetary gears 30 for operation of closure gates 14 and louvers 06; and foils 08, air pump 10, food, lighting to aid returning fish moving through fish siphon 28. Where steep terrain is encountered, apparatus can be repeated as units of dual siphons 26, 28 and pools 42 or tanks 42 to transport fish migrating upstream or downstream.

17 Claims, 2 Drawing Sheets

TWO-WAY FISH SIPHON OVERPASS

BACKGROUND—FIELD OF INVENTION

This invention relates to a method and apparatus for transporting migratory fish over dams so the fish can reach the ocean and return to spawning streams.

BACKGROUND—DESCRIPTION OF PRIOR ART

Migratory fish, salmon and steelhead in particular, depend on rivers for their passage to the ocean and back to their spawning streams. These streams and hundreds of smaller tributaries are both the beginning and the final life cycle for these fish. Although they spend only two or three years of their life in the ocean, this cycle between stream and ocean is vital to their survival as a species. Man-made dams, providing hydroelectric power and water for irrigation, limit the passage of the species to complete their life cycle. Both dams and salmon are critical to the Northwest economy. Because of dams and loss of spawning grounds, salmon and other migratory fish are endangered.

There is a need for a method and apparatus to transport fish migrating upstream and downstream over dams. Presently few fish survive. They are ground up by the power generators at the dams.

Efforts to solve this problem have resulted in several conduit systems for transporting fish. Excellent examples include D. L. Koch, U.S. Pat. No. 4,437,431; R. J. Zimmerman, U.S. Pat. No. 4,629,361; and D. R. Boylan, U.S. Pat. No. 5,161,913.

Koch describes and claims a system including conduits for receiving fish, located with the reservoir of a dam; the creation of an artificial stream within the conduits; and an extension of the conduit over or around the dam, terminating in the tailrace area downstream of the dam.

Zimmerman describes a system, devoid of mechanical devices, which extends past dams or other obstructions below and parallel with the surface of the stream. With this system fish can travel both upstream and downstream.

Boylan describes a system including conduits that reach the spawning areas; interior lighting to attract fish and keep them moving downstream; and a siphon over the dam that employs a pump to empty the fish and water on the downstream side of the dam.

All three recognize the need to get fish to the ocean. Zimmerman recognizes the need to provide the same passage for the return of the fish.

The existing systems have flaws:

(a) Koch and Boylan do not allow for return of fish;

(b) Zimmerman allows for return but his apparatus is not adaptable to steep or otherwise difficult terrain;

(c) Boylan uses a pumping action on the fish;

(d) Zimmerman does not slow the water for the return of the fish;

(e) none of the inventions uses a timing sequence.

Objects and Advantages

Accordingly, several objects and advantages of the two-way fish siphon overpass are:

(a) to provide a method and means to safely transport fish over the dam;

(b) to safely transport fish migrating both upstream and downstream;

(c) to adapt the apparatus to steep and difficult terrain;

(d) to slow water for fish migrating upstream;

(e) to re-establish the watershed as fish habitat;

(f) to transport fish over dam without subjecting fish to pumping action;

(g) to initially lure and transport fish to retrain for use of watershed as fish habitat, allowing for increased efficiency as generations of fish adapt;

(h) to use a timing device to avoid need for supervision of apparatus;

(i) to allow for manual or automatic control of apparatus;

(j) to power a fish siphon with a second siphon that powers gates, louvers, food, air.

Further objects and advantages of my invention will become apparent from a consideration of the drawings and ensuing description.

DRAWING FIGURES

FIG. 1 is a complete schematic of dual siphon apparatus.

Figure 2:
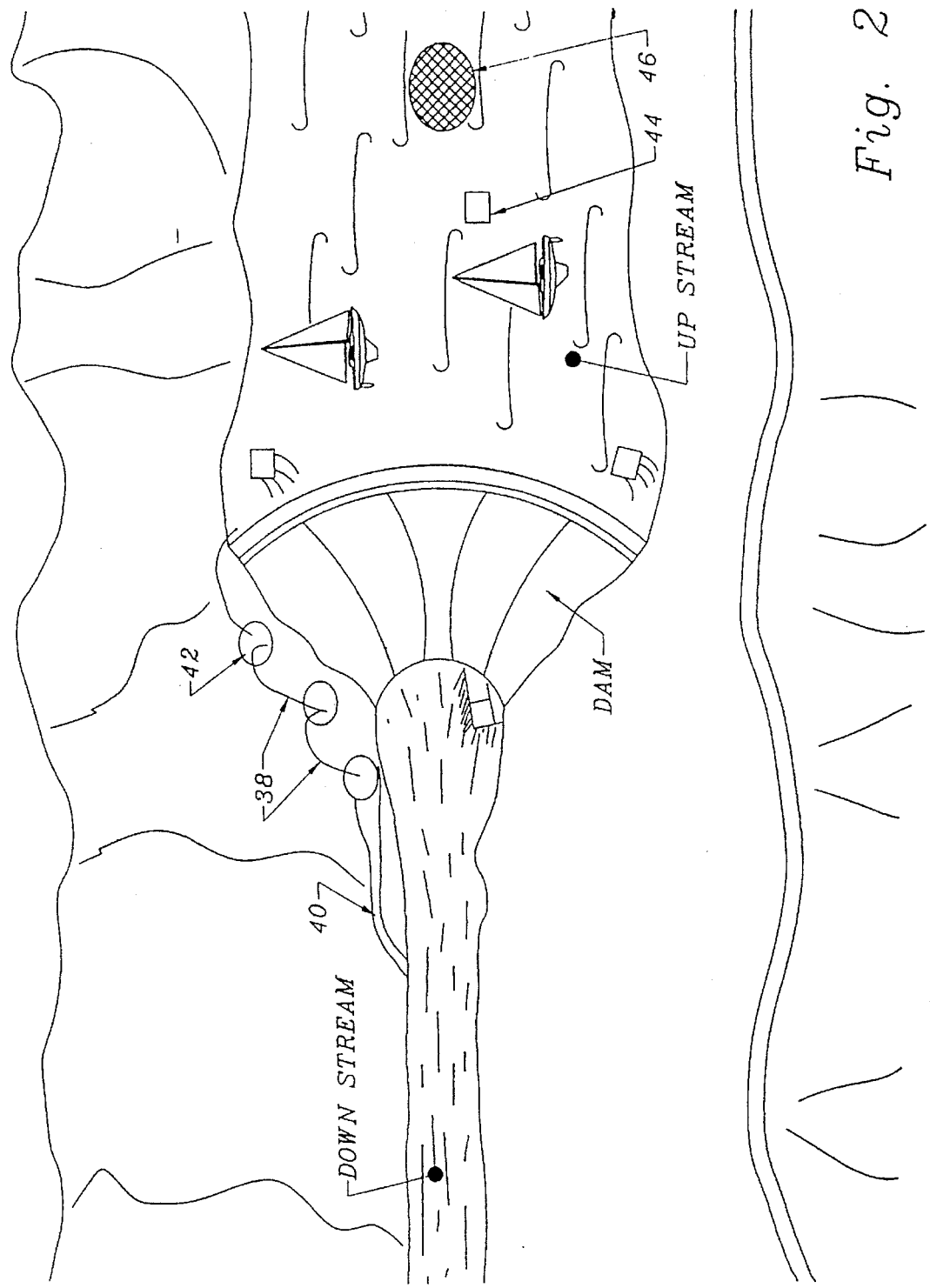

FIG. 2 demonstrates optional use of pools or tanks and siphons in steep terrain.

| List of Reference Numerals |
| --- |
| 04 porthole |
| 06 louvers |
| 08 foil |
| 10 air pump |
| 12 propeller |
| 14 closure gate |
| 16 fish screen |
| 18 fish attractants |
| 20 bearing |
| 22 braces |
| 26 power siphon |
| 28 fish siphon |
| 30 planetary gears |
| 32 shaft |
| 38 multiple siphons |
| 40 water channel |
| 42 pools or tanks |
| 44 barge |
| 46 fish net |

DESCRIPTION OF INVENTION

A typical embodiment of a two-way fish siphon overpass is shown in FIG. 1. A fish siphon 28 curves over dam to a downstream river. Fish siphon 28 can accommodate lighting through means such as but not limited to portholes or artificial lighting. Fish siphon 28 should be constructed of material with strength to withstand water pressure. Fish siphon 28 diameter must allow for passage of fish weighing 14 to 23 kg. This would most likely be a minimum diameter of 0.6 to 0.9 meters.

A power siphon 26 runs parallel to a fish siphon. It should be constructed of material to withstand water pressure. A diameter of a power siphon must accommodate a propeller 12, probably not to exceed 26 to 31 cm.

Braces 22 support fish siphon 28 on the dam. Braces 22 support power siphon 26 on fish siphon 28.

On a top side of power siphon 26 is a porthole 04 for filling power siphon 26 and then sealing power siphon 26. At both ends of power siphon 26 are propellers 12 attached to a shaft 32, bearings 20, and gears 30.

Gears 30 are attached to louvers 06 at both ends of fish siphon 28. Louvers 06 should be made of material strong enough to restrain a column of water. Width between individual louvers 06 must allow large fish weighing 14 to 23 kg through.

A closure gate 14 at each end of fish siphon 28 below louvers 06 and at each end of power siphon 26 is constructed of material sufficient to sustain water pressure.

Foils 08 inside downward portion of fish siphon 28 allow fish to rest while going upstream through fish siphon 28. An air pump 10 on downward portion of fish siphon 28 injects air at rate that carries bubbles downward.

A fish screen 16 at upstream opening of fish siphon 28 directs fish toward upstream opening of fish siphon 28. Fish attractants 18 of light, sound, and food are dispersed near both upstream and downstream fish siphon 28 openings.

FIG. 2 demonstrates optional use of pools 42 or tanks 42 and multiple sets of dual siphons 38. These provide steps for fish to go over dam in steep terrain. A water channel 40 may be necessary to give fish passage to or from pools 42 or tanks 42. Optional barges 44 could transport fish to upstream fish siphon 28 entrance. Optional fish net 46 could be used to transport seriously endangered species from spawning beds to fish siphon 28 upstream entrance. If water levels are low, barges 44 can be pulled up on hoists or trams to reach fish siphon 28 upstream entrance.

From description, a number of advantages are evident:

(a) Safe passage of fish downstream over dam is provided;

(b) Self-powered closure gates control flow. Slowed flow allows fish to return upstream, thus using natural instinct of fish.

(c) Transporting seriously endangered species could reestablish habitat in watershed.

(d) Future generations of fish may not need barge or fish net transport. Future operation of overpass then has the potential to operate more efficiently.

(e) Apparatus can be run manually or with a timer.

(f) Apparatus can be adapted to multiple units over steep dam sites.

(g) Apparatus could be manufactured off site.

Operation of Invention

Upper and lower closure gates 14 close and porthole 04 opens to fill power siphon 26 with water. Porthole 04 closes to seal power siphon 26. Both closure gates 14 in power siphon 26 open simultaneously. The water pressure activates and turns propellers 12.

Propellers 12 connected to planetary gears 30 by shaft 32 and bearing 20 activate planetary gears 30. Planetary gears 30 are adjusted to timing sequence (not shown). Planetary gears 30 open louvers 06 in fish siphon 28.

If fish are migrating downstream, both louvers 06 in fish siphon 28 open.

If fish are returning upstream, upper louver 06 in fish siphon 28 closes partially and lower louver 06 in fish siphon 28 opens. This slows flow of water. Fish follow attractants 18 and enter fish siphon 28 downstream. Fish siphon 28 contains light, air from air pump 10, and food. Foils 08 provide rest area for fish.

After fish enter fish siphon 28 to travel upstream, the bottom louver 06 in fish siphon 28 closes partially. The top louver 06 in fish siphon 28 opens fully so fish can exit.

Summary, Ramifications, and Scope

Thus it is clear that two-way fish siphon overpass provides safe passage for migrating fish traveling both upstream and downstream. Fish are not subject to any pumping action. Fish can return through siphon because water is slowed.

While my above description contains specificities, these should not be construed as limitations on the scope of the invention, but rather as an exemplification.

Many other variations are possible. For example:

(a) Apparatus adapts to steep terrain. Units of pools or tanks and dual siphons in any combination can be used to adapt the apparatus.

(b) Siphons could extend to accommodate temperatures at different water levels. Fish are sensitive to water temperature.

(c) Fish siphon could be powered by electric power instead of by power siphon.

(d) Timers could control all actions of the apparatus.

(e) Barge transport and fish net transport could deposit fish directly at opening of fish siphon.

Accordingly, the scope of the invention should be determined not by the embodiment(s) illustrated, but by the appended claims and their legal equivalents.

I claim:

1. A method for transporting migratory fish upstream and downstream of a hydroelectric dam comprising the steps of:

providing attractants at downstream and upstream entrances of a fish siphon for luring fish into said fish siphon;

slowing water flow within said fish siphon so to allow fish to swim up said fish siphon;

transporting endangered or reluctant fish to said upstream entrance of said fish siphon;

providing food, air, light, and resting areas within said fish siphon.

2. The method of claim 1 further comprising comprises the step of transporting endangered species from spawning beds to said upstream entrance of said fish siphon via fish nets.

3. The method of claim 1 further comprising the step of transporting reluctant species to said upstream entrance of said fish siphon via barges.

4. The method of claim 1 further comprising supplying man-, made water pools or tanks to assist fish migration in steep terrain.

5. Apparatus for transporting migratory fish upstream and downstream of a hydroelectric dam comprising:

a fish siphon as a dam overpass for using gravity flow to transport entering and exiting fish;

a power siphon as hydroelectric power source for gear operation of louvers of said fish siphon;

said louvers within said fish siphon as mechanism to slow water in downward portion of said fish siphon;

fish attractants at both downstream and upstream entrances of said fish siphon;

directional fish guides at said upstream of said fish siphon; and in combination, means for manual operation and automatic operation of said apparatus.

6. The apparatus of claim 5 wherein said fish siphon contains closure gates at said upstream and downstream entrances of said fish siphon.

7. The apparatus of claim 5 wherein said fish siphon contains foils as needed to provide rest areas for said fish.

8. The apparatus of claim 5 wherein said fish siphon contains sources of light, food, and air pump.

9. The apparatus of claim 5 wherein said power siphon contains closure gates at both ends of said power siphon.

10. The apparatus of claim 5 wherein said power siphon contains a porthole which allows said power siphon to be filled with water.

11. The apparatus of claim 5 wherein said power siphon contains a propeller connected to a shaft and a bearing.

12. The apparatus of claim 11 wherein said shaft and bearing connect to planetary gears causing the louvers to operate in said fish siphon with or without timing sequences.

13. The apparatus of claim 5 wherein said fish siphon contains directional fish screens at said upstream entrance said fish screens to functions as guides for fish.

14. The apparatus of claim 5 wherein said fish attractants are comprised of sound, light, and food.

15. The apparatus of claim 5 wherein braces support said fish siphon on said hydroelectric dam.

16. The apparatus of claim 5 wherein braces support said power siphon on said fish siphon.

17. The apparatus of claim 5 wherein man-, made pools or tanks are supplied to assist fish transportation over steep terrain.

* * * * *